(12) United States Patent
Karpenko et al.

(10) Patent No.: US 9,821,781 B1
(45) Date of Patent: Nov. 21, 2017

(54) METHODS AND APPARATUS TO CONTROL BRAKING OF A VEHICLE DURING LOW DECELERATION OPERATIONS

(71) Applicant: Ford Global Technologies, LLC, Dearborn, MI (US)

(72) Inventors: Yuri Anatoly Karpenko, Brighton, MI (US); Todd Anthony Brittingham, White Lake, MI (US); Moses Alexander Fridman, West Bloomfield, MI (US); Peter Kowalow, Windsor (CA); Ravi Lanka, Northville, MI (US); Jinkoo Lee, Ann Arbor, MI (US); Zachary Konchan, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/281,158

(22) Filed: Sep. 30, 2016

(51) Int. Cl.
*B60T 8/32* (2006.01)
*B60T 7/04* (2006.01)

(52) U.S. Cl.
CPC .............. *B60T 8/326* (2013.01); *B60T 7/042* (2013.01)

(58) Field of Classification Search
CPC .................................. B60T 8/326; B60T 7/042
USPC .......................................................... 701/70
See application file for complete search history.

(56) References Cited

U.S. PATENT DOCUMENTS

| | | | | |
|---|---|---|---|---|
| 3,637,264 A | * | 1/1972 | Leiber | B60T 8/17613 188/181 A |
| 3,829,167 A | * | 8/1974 | Rouf | B64C 25/426 188/181 A |
| 4,653,816 A | | 3/1987 | Lin | |
| 4,671,576 A | * | 6/1987 | Fourie | B60T 8/1705 188/156 |
| 4,685,746 A | * | 8/1987 | Matsuda | B60T 8/17616 303/183 |
| 5,123,715 A | * | 6/1992 | Okubo | B60T 8/172 303/150 |
| 5,816,667 A | | 10/1998 | Jokic | |
| 6,264,292 B1 | * | 7/2001 | Umeno | B60T 8/172 303/163 |
| 6,309,031 B1 | | 10/2001 | Crombez et al. | |
| 6,658,343 B1 | * | 12/2003 | Koch | B60T 8/1755 701/71 |
| 7,475,953 B2 | | 1/2009 | Osborn et al. | |
| 7,755,475 B2 | * | 7/2010 | Toelge | B60Q 1/444 188/1.11 E |
| 7,814,751 B2 | | 10/2010 | Ebert | |
| 8,417,429 B2 | | 4/2013 | Sekiya et al. | |

(Continued)

FOREIGN PATENT DOCUMENTS

| | | |
|---|---|---|
| DE | 102011084781 | 4/2013 |
| WO | 03068575 | 8/2003 |
| WO | 2016030089 | 3/2016 |

*Primary Examiner* — Tyler J Lee
(74) *Attorney, Agent, or Firm* — Raymond Coppiellie; Hanley, Flight & Zimmerman, LLC

(57) ABSTRACT

Methods and apparatus to control braking of a vehicle during low deceleration operations are disclosed. A disclosed apparatus includes a controller configured to determine a deceleration of a vehicle, compare the deceleration to a threshold, and modulate, at a predetermined frequency, a brake pressure of the vehicle in response to the deceleration being below the threshold.

16 Claims, 6 Drawing Sheets

(56) References Cited

U.S. PATENT DOCUMENTS

| | | | |
|---|---|---|---|
| 2008/0133099 A1* | 6/2008 | Laiou | B60T 7/22 701/70 |
| 2011/0178688 A1* | 7/2011 | Knechtges | B60T 8/3275 701/70 |
| 2013/0162009 A1* | 6/2013 | Mitts | B60L 3/102 303/3 |
| 2013/0304335 A1* | 11/2013 | Suzuki | B60W 10/184 701/51 |
| 2015/0202964 A1* | 7/2015 | Nefcy | B60L 7/18 701/70 |
| 2015/0210259 A1* | 7/2015 | Agnew | B60T 13/662 701/41 |
| 2016/0059833 A1 | 3/2016 | Evans et al. | |

* cited by examiner

US 9,821,781 B1

METHODS AND APPARATUS TO CONTROL BRAKING OF A VEHICLE DURING LOW DECELERATION OPERATIONS

FIELD OF THE DISCLOSURE

This disclosure relates generally to vehicle brake systems and, more particularly, methods and apparatus to control braking of a vehicle during low deceleration operations.

BACKGROUND

Vehicle brake systems are typically controlled by a brake pressure that is regulated by at least one of a person (e.g. a driver) or a brake controller. Vehicle brake controllers typically monitor and regulate braking forces applied by a person or an autonomous controller (e.g., an adaptive cruise control system) to improve brake feel, braking performance, fuel economy, etc. Some known vehicle brake controllers include or cooperate with an anti-lock braking system (ABS) that regulates a brake pressure of the vehicle to minimize wheel lockup in response to monitoring and analyzing a deceleration and a wheel speed of the vehicle. In other known examples, a brake pressure of the vehicle is regulated to increase fuel economy by reducing brake drag.

SUMMARY

An example apparatus includes a controller configured to determine a deceleration of a vehicle, compare the deceleration to a threshold, and modulate, at a predetermined frequency, a brake pressure of the vehicle in response to the deceleration being below the threshold.

Another example apparatus includes a controller configured to detect a brake apply operation of a vehicle and modulate, at a predetermined frequency, a brake pressure of the vehicle in response to the detection of the brake apply operation.

An example tangible machine-readable medium includes instructions, which when executed, cause a processor to at least determine a deceleration of a vehicle, compare the deceleration to a first threshold, and modulate, at a predetermined frequency, a brake pressure of the vehicle in response to the deceleration being below the first threshold.

BRIEF DESCRIPTION OF THE DRAWINGS

The figures disclosed herein are not to scale. Wherever possible, the same reference numbers will be used throughout the drawings and accompanying written descriptions to refer to the same or like parts.

DETAILED DESCRIPTION

Figure 1:
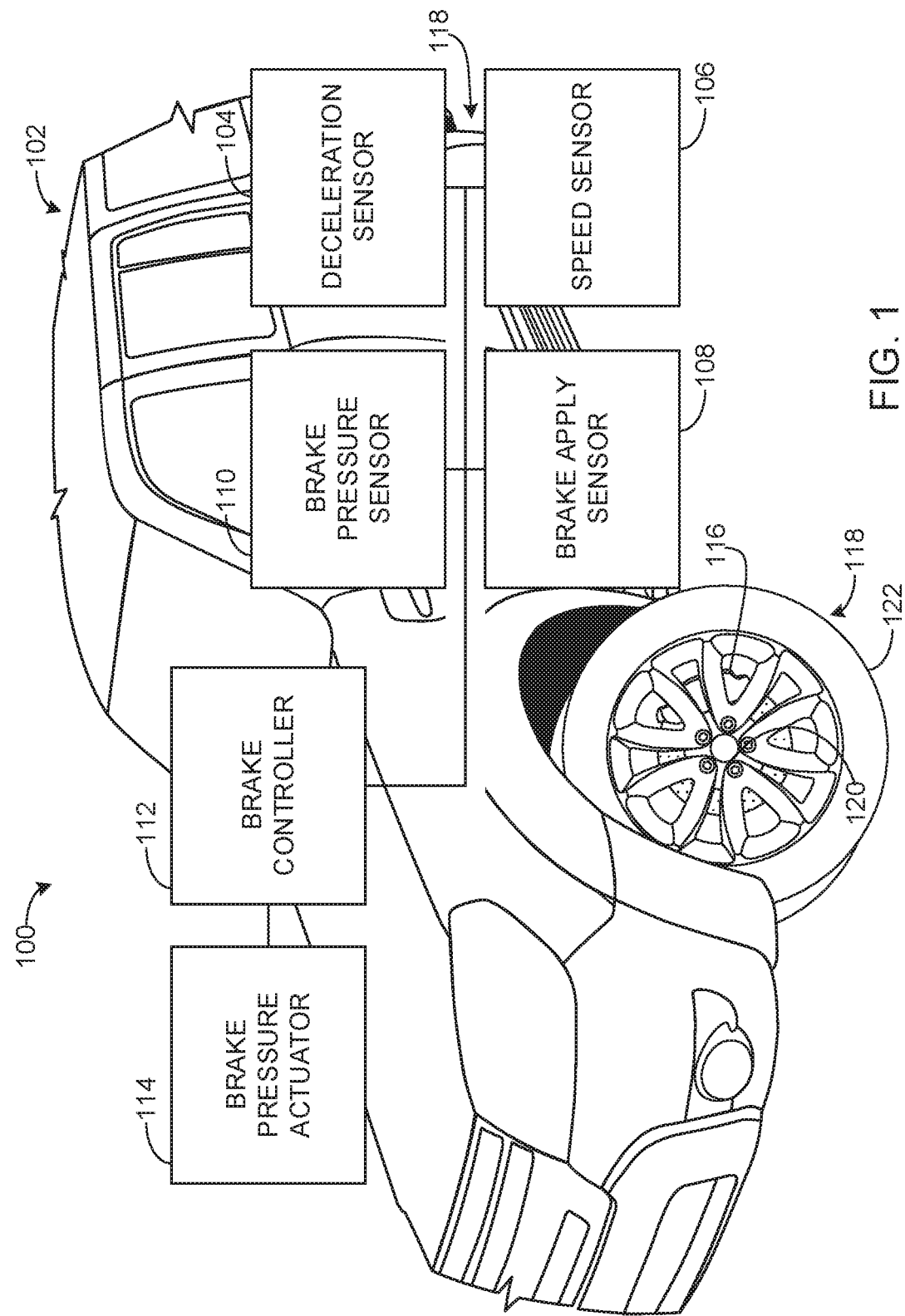
FIG. 1 is a schematic illustration of an example vehicle having an example brake control system that may implement methods and apparatus in accordance with the teachings of this disclosure.

Vehicle brake controllers typically govern a braking input from a driver or driver assisted technology (e.g., a fully assisted parking aide system, an adaptive cruise control system, etc.) during vehicle maneuvers. These brake controllers may be operatively interposed between a brake pedal operated by a driver or an autonomous controller of the vehicle and actuating components (e.g. calipers) of the vehicle braking system. Known brake controllers monitor certain dynamic characteristics of the vehicle (e.g. deceleration) and respond by controlling a brake pressure to improve the safety, braking performance, and/or fuel economy of the vehicle. For example, wheel rotation may be monitored to detect a wheel lockup condition during heavy braking maneuvers (i.e. a high deceleration condition) and the brake controller may respond by employing an anti-lock system to reduce a brake fluid pressure within the actuating components and, thus, reduce braking forces to eliminate the wheel lockup condition. In another example, a brake fluid pressure may be monitored to detect an emergency braking condition during vehicle operation (i.e. a high brake pressure condition) and the brake controller may respond by decreasing response time of the brake fluid pressure to an actuating component to improve braking responsiveness and control.

The above-mentioned known brake controllers fail to address braking related issues that can occur during low deceleration braking maneuvers or vehicle operations that require low braking forces and/or light brake pedal inputs from a driver. For example, when maneuvering a vehicle in a parking lot, a driver may desire a low deceleration and apply relatively light touches to the brake pedal to generate low braking forces. Additionally or alternatively, braking forces may be generated independently of a person within the vehicle. For example, an adaptive cruise control system may request a braking operation to generate relatively light braking forces during an autonomous driving maneuver. In another example, a fully assisted parking aide system generates low braking forces during an autonomous parking maneuver. During such low deceleration braking operations, a driver can experience deficiencies in braking response or brake pedal feel, such as the brakes sticking or grabbing, which may be caused by brake pad misalignment and/or other non-ideal characteristics and relationships between components within the brake system. These deficiencies can further reduce performance of the braking components and cause a deceleration of the vehicle to fluctuate or have non-smooth changes during braking operations. This may be undesirable to a driver or user of the vehicle and may have a negative effect on a perception of the brake system, the vehicle, a maker of the vehicle, etc.

The examples disclosed herein control braking during low deceleration vehicle operations and maneuvers and address the above-mentioned issues within brake systems. More specifically, the examples disclosed herein provide a brake controller that monitors for conditions associated with low deceleration braking operations and, when such a condition is detected, modulate a brake fluid pressure at a predetermined frequency to cyclically increase and decrease the brake fluid pressure and, thus, cyclically increase and decrease braking forces that would have otherwise been applied in the absence of the modulation. This modulation of brake fluid pressures can correct or compensate for brake pad misalignment (e.g., influence a more uniform or consistent contact between the brake pads and brake rotors) and/or other non-ideal conditions and relationships between the brake pads, brake rotors, and/or brake calipers, thereby reducing or eliminating the poor braking performance and brake pedal feel that would have otherwise occurred. In the disclosed examples, characteristics of the modulation (e.g., waveform shape, frequency, amplitude, etc.) may be selected and/or predetermined to effectively improve brake pedal feel and, more generally, braking performance under low deceleration conditions while remaining substantially imperceptible to a driver or user of the vehicle (i.e. the driver and/or user may not perceive the modulation). Additionally, the characteristics of the modulation may be selected based on the determination of certain driving conditions (e.g. a terrain, a maneuver, etc.) of the vehicle 102.

In some disclosed examples, the modulation of the brake fluid pressure previously described is performed in response to the detection of a deceleration of the vehicle being below a threshold during braking operations, which may be performed by a driver (e.g. a person), or by a controller (e.g. an automated parking system). Additionally or alternatively, the modulation of the brake fluid pressure may be performed in response to, at least in part, a speed of the vehicle being below a threshold and/or based on a comparison of one or more other driving conditions to one or more respective thresholds.

FIG. 1 is a schematic illustration of an example brake control system 100 in accordance with the teachings of this disclosure. The system 100 of the illustrated example may be implemented on a vehicle (e.g. a car, a truck, a bus, etc.) 102. The example system 100 includes a deceleration sensor 104, a speed sensor 106, a brake apply sensor 108, a brake pressure sensor 110, a brake controller 112 (e.g. a brake control module), and a brake pressure actuator 114 within the vehicle 102. The example vehicle 102 includes wheel assemblies 118, each of which includes a brake assembly 116, a wheel 120 and a tire 122. In this example, the vehicle 102 includes multiple wheel assemblies 118. However, for conciseness, the examples disclosed herein will be described in the context of a single wheel/brake assembly.

The deceleration sensor 104 determines a deceleration and/or a deceleration status of the vehicle 102. For example, the deceleration sensor 104 may determine a value of deceleration (e.g., 1 meter per second per second, 5 meters per second per second, etc.) or whether the vehicle 102 is in a state of deceleration.

The speed sensor 106 determines a speed and/or speed status of the vehicle 102. For example, the speed sensor 106 may determine a value of speed (e.g., 1 meter per second, 10 meters per second, etc.) of the vehicle 102 and/or, more generally, whether the vehicle 102 is stationary or in a state of motion.

The brake pressure sensor 110 determines a brake pressure (e.g. a brake fluid pressure) within the vehicle (e.g. a master brake cylinder) 102 or within the brake assembly (e.g. a wheel brake cylinder) 116 of the vehicle 102. For example, the brake pressure sensor 110 may determine a value of a brake fluid pressure (e.g., 10 kilopascals, 100 kilopascal, etc.) within a master brake cylinder of the vehicle 102.

The brake apply sensor 108 determines a braking operation of the vehicle 102. For example, the brake apply sensor 108 may determine that a brake pedal within the vehicle 102 is engaged (e.g., depressed or applied). In another example, the brake apply sensor 108 may determine a displacement and/or a path of displacement of a brake pedal (e.g. a brake-by-wire system). Additionally or alternatively, the brake apply sensor 108 may detect a braking operation requested by a driver or an autonomous controller (e.g. an automated parking system) of the vehicle 102.

The brake pressure actuator 114 affects, modulates, and/or controls a brake pressure within the vehicle 102 to effect braking forces generated within the brake assembly 116 during operation and maneuvers of the vehicle 102. For example, the brake pressure actuator 114 may increase a brake fluid pressure within the brake assembly 116 to increase braking forces generated within the brake assembly 116.

The brake controller 112 is operationally interposed between a brake pedal of the vehicle 102 and the brake pressure actuator 114 to regulate or govern a brake pressure and/or braking forces generated within the brake assembly 116. The brake controller 112 may be communicatively coupled to the brake pressure actuator 114 to control the brake pressure actuator 114. The brake controller 112 may also be communicatively coupled to a brake pedal of the vehicle 102 to respond to brake pedal inputs. For example, the brake controller 112 may communicate with the brake pressure actuator 114 to increase a brake fluid pressure within the brake assembly 116 in response to a driver input to the brake pedal (i.e. performing a braking operation) of the vehicle 102.

During braking operations or maneuvers of the vehicle 102, the brake assembly 116 is used to frictionally engage a brake pad to a rotor coupled to the wheel 120 to reduce the rate of rotation of the wheel assembly 118 and, thus, reduce a speed of the vehicle 102. The brake assembly 116 is at least partially controlled by the brake pressure actuator 114, which is at least partially controlled by the brake controller 112. The example brake pressure actuator 114 controls and/or modulates a brake fluid pressure within the brake assembly 116 to govern the frictional engagement of components within the brake assembly 116. In this example, the brake pressure actuator 114 may be implemented as an external component (i.e. independent and/or separate from a component native to the vehicle 102) or by using a pre-existing pressure actuator within the vehicle 102 (e.g. a brake booster).

During operations or maneuvers of the vehicle 102, at least one of the deceleration sensor 104, the speed sensor 106, the brake apply sensor 108 and/or the brake pressure sensor 110 may collect data and/or information. In these examples, the brake controller 112 may also be implemented as an external component or by using a pre-existing brake control module (e.g. an anti-lock braking system). Additionally or alternatively, other components of the example brake control system 100 may be implemented using components (e.g. hardware, software, etc.) native to the vehicle 102.

To control whether the brake pressure actuator 114 controls and/or modulates a brake pressure (i.e. the engagement of brake control system 100), the brake controller 112 of the illustrated example determines whether condition(s) for engagement have been met or satisfied by communicating and/or receiving data from at least one of the deceleration sensor 104, the speed sensor 106, the brake apply sensor 108 and/or the brake pressure sensor 110. In some examples, the deceleration sensor 104 provides information/data (e.g., deceleration/information data, information indicative of whether the vehicle 102 is decelerating at a rate higher than a threshold, etc.) to the brake controller 112 so that the brake controller 112 can further determine whether to control the brake pressure actuator 114. In some other examples, the brake apply sensor 108 provides information/data (e.g., braking operation information/data, information indicating whether a driver of the vehicle 102 is performing a braking operation, etc.) to the brake controller 112 so that the brake controller 112 can further determine whether to control the brake pressure actuator 114.

During the engagement of the example brake control system 100, a brake fluid pressure within the brake assembly 116 is at least partially controlled and/or modulated by the brake pressure actuator 114, which is at least partially controlled by the brake controller 112. As described in greater detail below, under certain braking conditions (e.g., low deceleration maneuvers), the brake fluid pressure within the brake assembly 116 may be controlled and/or modulated by the brake control system 100 to cyclically increase and decrease. This type of modulation cyclically increases and decreases the amount of frictional engagement between braking components (e.g., brake pads, braking surfaces of the rotor, etc.) within the brake assembly 116 and, thus, cyclically increases and decreases braking forces generated within the brake assembly 116 that would have otherwise existed in the absence of the modulation.

In some examples, as noted above, the brake pressure actuator 114 receives a command signal from the brake controller 112 during the engagement of the brake control system 100 to modulate a brake pressure to cyclically increase and decrease. In such examples, the command signal may have predetermined properties or characteristics (e.g., amplitude, frequency, etc.). In some examples, the command signal is a predetermined waveform (e.g., a sinusoidal, a sawtooth, or a square waveform) having predetermined characteristics (e.g., amplitude, frequency, etc.).

Figure 2A:
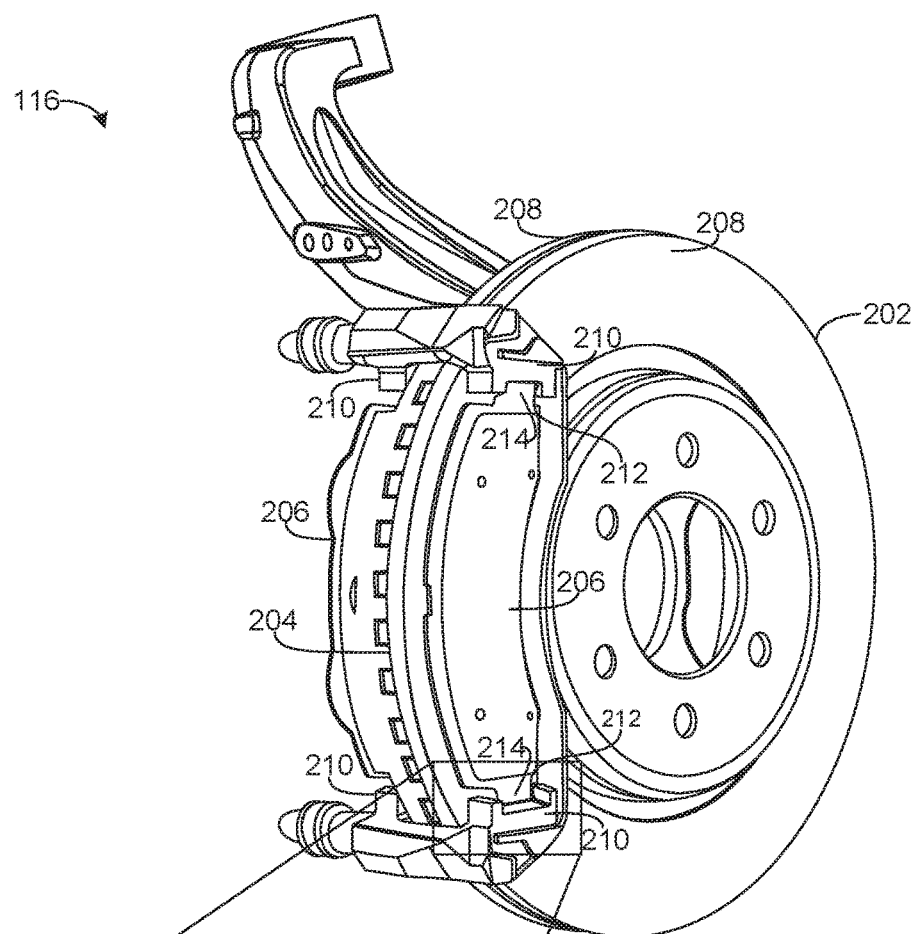
FIGS. 2A and 2B are more detailed views of portions of an example brake system within the example vehicle of FIG. 1.
Figure 2B:
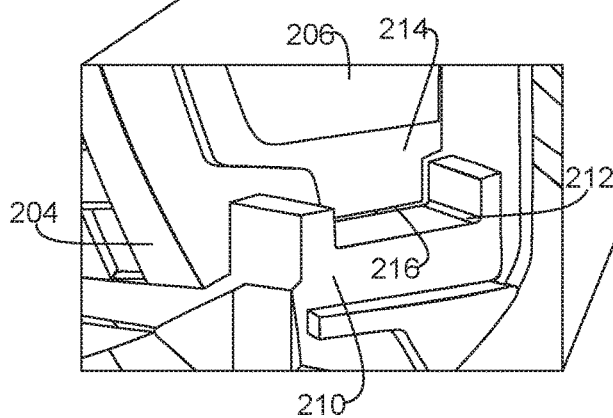

FIG. 2A is an enlarged view of the example brake assembly 116 of FIG. 1, and FIG. 2B provides an enlarged illustration of a portion of the view shown in FIG. 2A. In this example, the brake assembly 116 is depicted as a disc brake assembly. However, the examples depicted herein may be more generally applied to other types of brake assemblies if desired. Turning in detail to FIG. 2A, the example brake assembly 116 includes a rotor 202 and a carrier 204. The carrier 204 holds a pair of opposing brake pads 206 in proximity to respective opposing braking surfaces 208 of the rotor 202, and a caliper (not shown) is typically slidably or fixedly mounted to the carrier 204 to enable the caliper to force the brake pads 206 into frictional engagement with the braking surfaces 208 of the rotor 202 in response to driver inputs to the vehicle brake pedal and/or in response to other control devices (e.g., autonomous controls, anti-lock braking controls, etc.) of the vehicle 102. The frictional engagement of the brake pads 206 with the braking surfaces 208 of the rotor 202 effects a deceleration of the vehicle 102 and, if desired, stops the vehicle 102.

The caliper has been removed from the illustration in FIG. 2A to more clearly show the relationship between the brake pads 206, the carrier 204 and the rotor 202. In particular, the carrier 204 includes opposing abutments 210 associated with each of the brake pads 206. The abutments 210 associated with the rightmost brake pad 206 and braking surface 208 (in the orientation of FIG. 2A) can be clearly seen in FIG. 2A. However, the leftmost brake pad 206, the leftmost braking surface 208, and the abutments 210 associated with that brake pad 206 and braking surface 208 are not clearly shown, but exist in a mirrored relationship to the abutments 210 associated with the rightmost brake pad 206 and braking surface 208. The abutments 210 capture the brake pads 206 within the carrier 204 to limit the movement of the brake pads 206 in the direction of rotation of the rotor 202, particularly under braking conditions. Additionally, the abutments 210 guide the movement of the brake pads 206 toward and away from the braking surfaces 208 of the rotor 202 during braking operations and the cessation of braking operations. As depicted in the example of FIG. 2A, the abutments 210 provides respective grooves 212 or channels in which corresponding tabs 214 (e.g., fingers, projections, etc.) of the brake pads 206 are slidably engaged. While these abutments 210 and associated grooves 212 provide reasonably accurate control over the location and range of movement of the brake pads 206 relative to the braking surfaces 208 of the rotor 202, a certain amount of clearance or gap 216 (FIG. 2B) between the tabs 214 of the brake pads 206 and the surfaces of the abutments 210 is typically provided to prevent binding of the brake pads 206 within the carrier 204. This clearance 216 ensures the brake pads 206 are free to move toward and away from the rotor 202 as needed despite dimensional tolerances, wear, dimensional variation due to temperature changes, dirt accumulation and/or corrosion of the carrier 204 and brake pads 206.

Figure 2C:
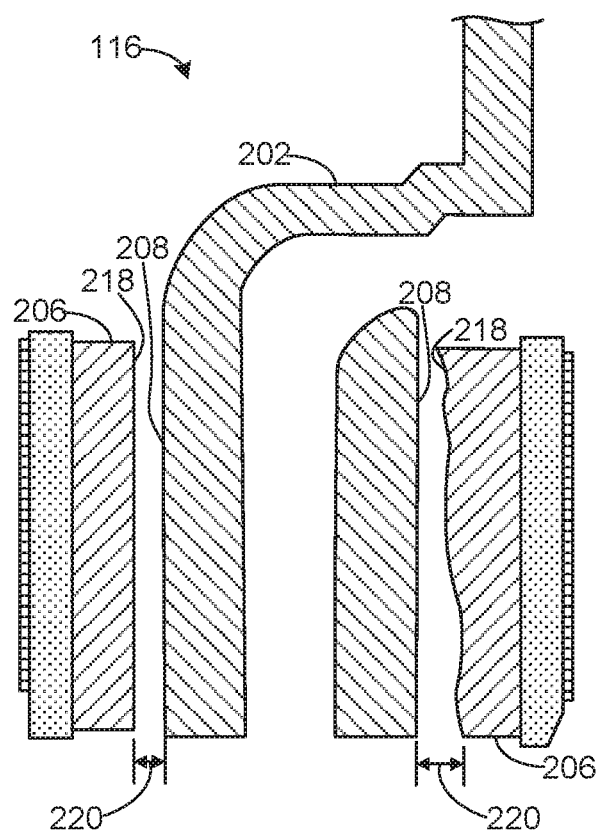
FIG. 2C is a cross-sectional view of FIG. 2B to illustrate an example problem within the example brake system of FIGS. 2A and 2B.

FIG. 2C is a cross-sectional view of the brake assembly 116 depicted in FIGS. 2A and 2B. FIG. 2C shows brake linings 218 of the brake pads 206 as spaced from the braking surfaces 208 of the rotor 202 as would be typical prior to the initiation of a braking operation. In other words, in the illustration of FIG. 2C, the caliper is not urging the brake pads 206 into a complete frictional engagement with the braking surfaces 208 such that only a portion of a surface of the brake linings 218 is in contact with the braking surfaces 208 of the rotor 202. Thus, prior to initiation of a braking operation, the brake linings 218 of the brake pads 206 may be spaced by respective gaps 220 from the braking surfaces 208. As illustrated in FIG. 2C, the gaps 220 between the brake linings 218 and the braking surfaces 208 may not be uniform along the width and/or length of the brake linings 218 due to taper wear of the brake linings 218, coning of the rotor 202 and/or other non-ideal conditions of the rotor 202 and brake pads 206. In some examples, the gaps 220 between the brake pads 206 and the carrier 204 and/or the clearance 216 between the tabs 214 of the brake pads 206 and the abutments 210 allows for an orientation of the brake pads 206 to shift with respect to the braking surfaces 208, further resulting in a non-uniform gap 220 between the brake linings 218 and the braking surfaces 208. As a result, prior to the initiation of a braking operation, the brake linings 218 may be non-parallel and/or otherwise misaligned relative to the braking surfaces 208.

During braking operations, misalignment of the brake linings 218 relative to the braking surfaces 208 of the rotor 202 can cause erratic, fluctuating, and/or unstable frictional engagement between the brake pads 206 and the rotor 202, thereby negatively affecting the brake pedal response and the driver's perception of the braking operation and/or reduce overall braking performance of the brake assembly 116. In particular, erratic, fluctuating, and/or unstable frictional engagement may be significant when a relatively low brake fluid pressure is supplied to the caliper such that the caliper is not urging the brake pads 206 into a complete, consistent, and/or stable frictional engagement with the braking surfaces 208 of the rotor 202.

Figure 3:
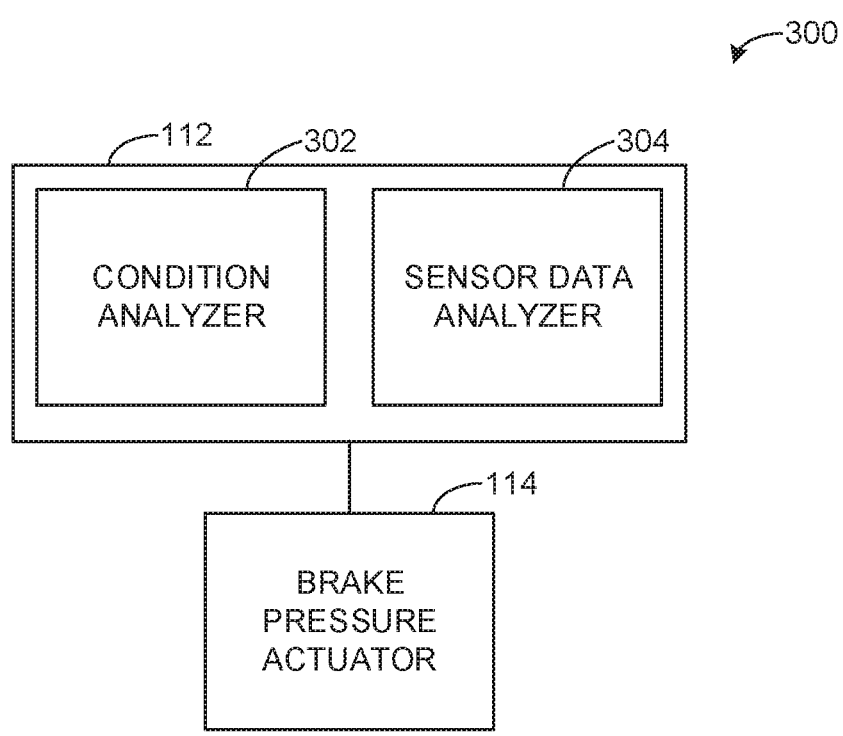
FIG. 3 illustrates a block diagram of an example apparatus to implement the examples disclosed herein.

FIG. 3 is a schematic block diagram overview of an example brake modulation system 300 to implement the examples disclosed herein. The example brake modulation system 300 includes the example brake controller 112, which includes a condition analyzer 302 and a sensor data analyzer 304. The brake modulation system 300 also includes the example brake pressure actuator 114.

The brake pressure actuator 114 may be communicatively coupled to the brake controller 112 to receive command signals to control and/or modulate a brake pressure within the vehicle 102 during the engagement of the brake modulation system 300. For example, the brake pressure actuator 114 may cyclically increase and decrease a brake fluid pressure within a caliper of the brake assembly 116 in response to receiving a signal from the brake controller 112.

The example brake controller 112 controls the brake pressure actuator 114 during the engagement of the brake modulation system 300. The brake controller 112 may be communicatively coupled to the brake pressure actuator 114 to generate and send signals having predetermined properties or characteristics (e.g., waveform shape (e.g., sinusoidal, sawtooth, square, etc.), frequency, amplitude, etc.) to control the brake pressure actuator 114. For example, the brake controller 112 may send a signal to the brake pressure actuator 114 periodically (e.g. every 10 milliseconds) during the engagement of the brake modulation system 300.

The example sensor data analyzer 304 receives incoming sensor data from at least one sensor (e.g., the deceleration sensor 104, the brake apply sensor 108, etc.) of the vehicle 102 to encode, analyze, filter and/or pre-process data and/or information from the sensor(s) for the condition analyzer 302. For example, the sensor data analyzer 304 receives deceleration data/information from the deceleration sensor 104 and determines a deceleration value of the vehicle 102. In such examples, the sensor data analyzer 304 may provide a signal to the condition analyzer 302 indicating the deceleration value of the vehicle 102. In some examples, the sensor data analyzer 304 determines periodically (e.g., every 10 milliseconds, every 100 milliseconds, etc.) a deceleration value of the vehicle 102. In some examples, this information is sent along with and/or in conjunction with a signal related to a brake apply operation (i.e. data/information collected by the brake apply sensor 108) and/or other information or data.

To determine and/or control the engagement of the brake modulation system 300, the example condition analyzer 302 communicates with the sensor data analyzer 304 to determine whether at least one condition is sufficient to cause the brake modulation system 300 to engage. In this example, the condition analyzer 302 receives deceleration information from the sensor data analyzer 304 and determines whether a deceleration of the vehicle 102 is below (or at) a specific threshold (e.g. 1 meter per second per second, 5 meters per second per second, etc.) to engage the brake modulation system 300. Additionally or alternatively, the example condition analyzer 302 determines whether other conditions (e.g. a detection of a brake apply operation) are met based on other information/data (e.g. brake apply information/data from the brake apply sensor 108). The operation of the brake modulation system 300 is described in detail in connection with FIG. 4 below.

While an example brake modulation system 300 is illustrated in FIG. 3, one or more of the elements, processes and/or devices illustrated in FIG. 3 may be combined, divided, re-arranged, omitted, eliminated and/or implemented in any other way. Further, the example brake controller 112, the example brake pressure actuator 114, the example condition analyzer 302, the example sensor data analyzer 304 and/or more generally, the example brake modulation system 300 of FIG. 3 may be implemented by hardware, software, firmware and/or any combination of hardware, software and/or firmware. Thus, for example, any of the example brake controller 112, the example brake pressure actuator 114, the example condition analyzer 302, the example sensor data analyzer 304 and/or more generally, the example brake modulation system 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example brake controller 112, the example brake pressure actuator 114, the example condition analyzer 302, the example sensor data analyzer 304 and/or more generally, the example brake modulation system 300 is/are hereby expressly defined to include a tangible computer readable storage device or storage disk such as a memory storing the software and/or firmware. Further still, the example brake modulation system 300 of FIG. 3 may include one or more elements, processes and/or devices in addition to, or instead of, those illustrated in FIG. 3, and/or may include more than one of any or all of the illustrated elements, processes and devices.

Figure 4:
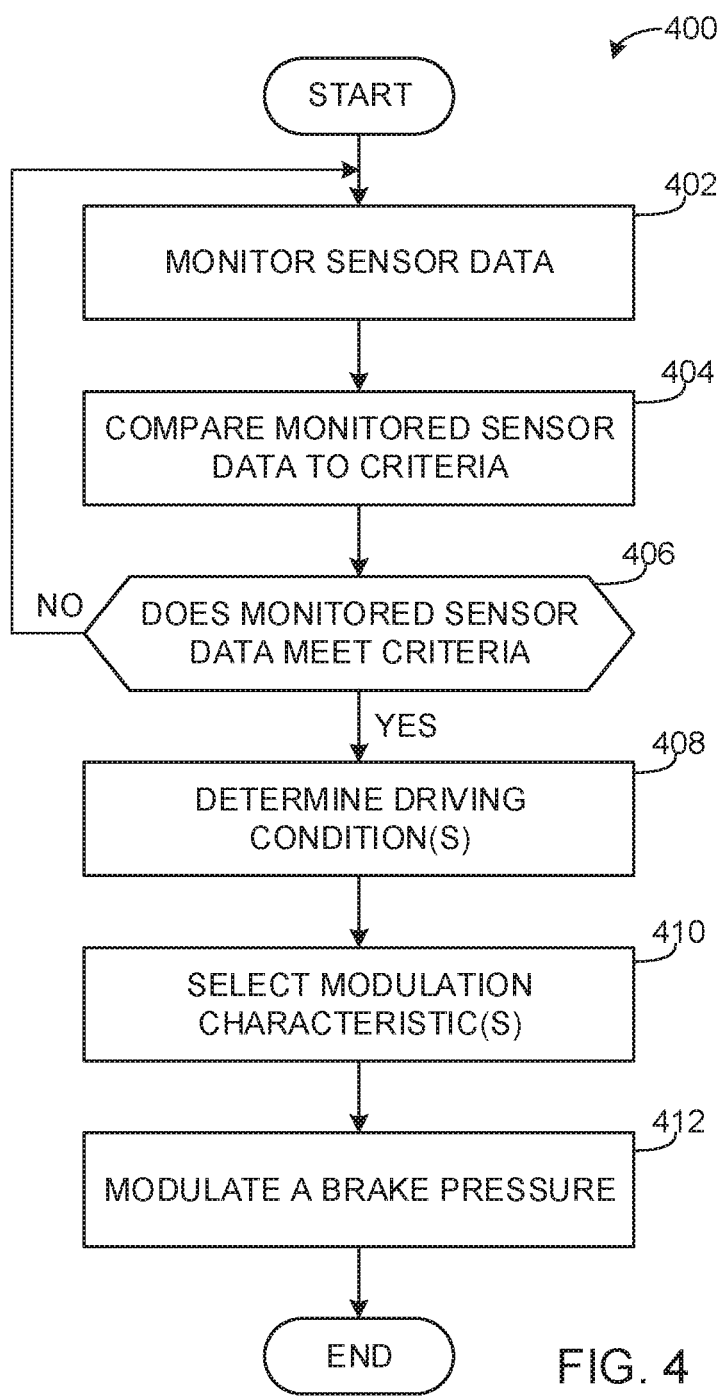
FIG. 4 is a flowchart representative of an example method to implement the examples disclosed herein.

A flowchart representative of an example method for implementing the example brake modulation system 300 of FIG. 3 is shown in FIG. 4. In this example, the method may be implemented by a program for execution by a processor such as the processor 502 shown in the example processor platform 500 discussed below in connection with FIG. 5. The program may be embodied in software stored on a tangible computer readable storage medium such as a CD-ROM, a floppy disk, a hard drive, or a memory associated with the processor 502, but the entire program and/or parts thereof could alternatively be executed by a device other than the processor 502 and/or embodied in firmware or dedicated hardware. Further, although the example program is described with reference to the flowchart illustrated in FIG. 4, other methods of implementing the example brake modulation system 300 may alternatively be used. For example, the order of execution of the blocks may be changed, and/or some of the blocks described may be changed, eliminated, or combined.

As previously mentioned above, the example method of FIG. 4 may be implemented using coded instructions (e.g. computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or other storage device or storage disk in which information is stored for any duration (e.g. for extended time periods, permanently, for brief instances, for temporarily buffering, and/or for caching of the information). As used herein, the term tangible readable storage medium is expressly defined to include any type of computer readable storage device and/or storage disk and to exclude propagating signals and to exclude all transmission media. As used herein, "tangible computer readable storage medium" and "tangible machine readable storage medium" are used interchangeably. Additionally or alternatively, the example method of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart representative of an example method 400 to implement the examples disclosed herein. The method 400 of FIG. 4 begins with the vehicle 102 being operated or used by an occupant (e.g., a driver, a passenger, etc.). Next, according to the illustrated example, the sensor data analyzer 304 communicates with at least one of the deceleration sensor 104, the speed sensor 106, the brake apply sensor 108, and/or the brake pressure sensor 110 to receive and/or monitor data/information collected by the sensor(s) (block 402). For example, the deceleration sensor 104 determines a deceleration of the vehicle and/or transmits a signal indicating a deceleration value and/or status to the sensor data analyzer 304. In some examples, the brake apply sensor 108 determines whether a braking operation (e.g. engagement or movement of a brake pedal) is being performed and/or transmits a signal that indicates a brake apply status (e.g. an engagement or disengagement of a brake pedal) to the sensor data analyzer 304. In other examples, other data/information (e.g. a speed, a brake pressure, etc.) is determined and/or transmitted to the sensor data analyzer 304. In some examples, this data/information is determined and/or transmitted periodically (e.g., every 10 milliseconds, 100 milliseconds, 1 second, etc.).

Next, the monitored and/or collected sensor data/information (block 402) is compared to criteria (block 404) by the condition analyzer 302 to determine if the sensor data/information meets or satisfies criteria. If the condition analyzer 302 determines at block 406 that the sensor data does not meet the criteria, control returns to block 402, otherwise, control proceeds to block 408.

For example, at block 406, the condition analyzer 302 may determine whether a deceleration is below (or at) a threshold (e.g., 1 meter per second per second, 5 meters per second per second, etc.). If the deceleration is determined to be below (or at) the threshold, the condition analyzer 302 then may also determine whether a brake apply operation is also detected. If a brake apply operation is also detected, the condition analyzer 302 may then determine that the sensor data meets or satisfies criteria and control proceeds to block 408, otherwise the condition analyzer 302 determines that the sensor data fails to meet or satisfy criteria and control returns to block 402.

In some examples, the condition analyzer 302 may determine that sensor data meets criteria based on the determination of at least one of: a deceleration being below (or at) a threshold; a detection of a brake apply operation; a speed being below (or at) a threshold (e.g., 1 meter per second, 10 meters per second, etc.); and/or a brake pressure being below (or at) a threshold (e.g., 10 kilopascals, 100 kilopascals, etc.), otherwise the condition analyzer 302 may determine that sensor data does not meet or satisfy criteria.

In some examples, the condition analyzer 302 determines whether sensor data meets or fails to meet criteria based on sensor data/information from one or more sensors (e.g., the deceleration sensor 104, the speed sensor 106, the brake apply sensor 108, the brake pressure sensor 110, etc.) being compared to one or more criteria, threshold(s) and/or condition(s).

Next, at block 408, the condition analyzer 302 makes a determination of one or more driving condition(s) (e.g., a maneuver (e.g. a turn), terrain (e.g., snow, sand, asphalt, etc.), weather (e.g., rain, sleet, etc.), etc.) of the vehicle 102 based on data/information received from either a sensor within the vehicle (e.g. an accelerometer (e.g. the deceleration sensor 104)) 102, input from a driver (e.g. a rotation of a steering wheel of the vehicle 102), or other sources of data/information indicative of a driving condition of the vehicle 102.

Next, the condition analyzer 302 selects one or more modulation characteristic(s) (block 410) based on the determination of the driving condition(s) at block 408. In some examples, the modulation characteristic is a type of waveform (e.g., a sinusoidal, a sawtooth, a square, etc.). In other examples, the modulation characteristic is a property of the waveform (e.g., frequency, amplitude, etc.) and/or a distribution of the control and/or modulation to multiple brake pressure actuators 114 within the vehicle 102 (i.e. the front brakes of the vehicle 102 receiving a different modulation characteristic than the rear brakes).

Next, the selected modulation characteristic(s) is/are incorporated and/or applied to the signal that is generated by the brake controller 112 during the engagement of the brake modulation system 300 (block 412).

For example, at block 408, the condition analyzer 302 MAY determine that the vehicle 102 is operating on dry pavement and/or performing a turn. The condition analyzer 302 then determines and/or selects a modulation characteristic (block 410) of a sinusoidal waveform having a frequency of 100 Hz and an equal distribution between the front brakes and the rear brakes of the vehicle 102.

Next, the brake modulation system 300 controls and/or modulates a brake pressure (block 412) within the vehicle 102 by generating a signal within the brake controller 112 having the selected and/or predetermined modulation characteristic(s).

In some examples, at block 412, the brake pressure actuator 114 receives a command signal having the selected and/or predetermined modulation characteristic generated by the brake controller 112 to modulate a brake fluid pressure within the vehicle 102 and/or brake assembly 116 to cyclically increase and decrease.

Figure 5:
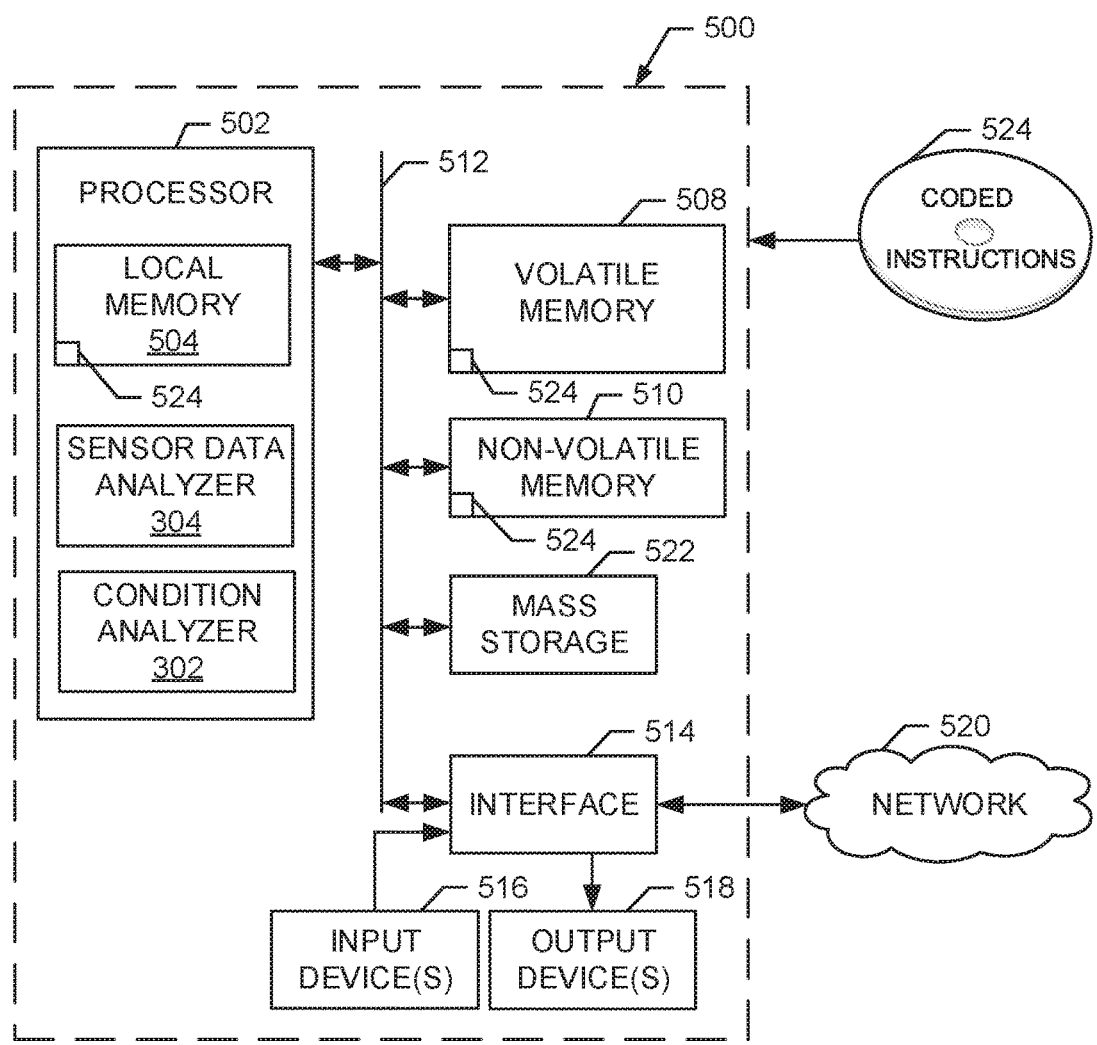
FIG. 5 is a block diagram of an example processor platform capable of executing machine readable instructions to implement the example method of FIG. 4.

FIG. 5 is a block diagram of an example processor platform 500 capable of executing instructions to implement the method of FIG. 4 and the brake modulation system 300 of FIG. 3. The processor platform 500 can be, for example, a server, a personal computer, a mobile device (e.g., a cell phone, a smart phone, a tablet such as an iPad™), a personal digital assistant (PDA), an Internet appliance, a personal video recorder, a set top box, or any other type of computing device.

The processor platform 500 of the illustrated example includes a processor 502. The processor 502 of the illustrated example is hardware. For example, the processor 502 can be implemented by one or more integrated circuits, logic circuits, microprocessors or controllers from any desired family or manufacturer.

The processor 502 of the illustrated example includes a local memory 504 (e.g., a cache). In this example, the processor 502 includes the example condition analyzer 302 and the example sensor data analyzer 304. The processor 502 of the illustrated example is in communication with a main memory 506 including volatile memory 508 and non-volatile memory 510 via a bus 512. The volatile memory 508 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 510 may be implemented by flash memory and/or any other desired type of memory device. Access to the main memory 506 is controlled by a memory controller.

The processor platform 500 of the illustrated example also includes an interface circuit 514. The interface circuit 514 may be implemented by any type of interface standard, such as an Ethernet interface, a universal serial bus (USB), and/or a PCI express interface.

In the illustrated example, one or more input devices 516 are connected to the interface circuit 514. The input device (s) 516 permit(s) a user to enter data and commands into the processor 502. The input device(s) 516 can be implemented by, for example, an audio sensor, a microphone, a camera (still or video), a keyboard, a button, a mouse, a touchscreen, a track-pad, a trackball, isopoint and/or a voice recognition system.

One or more output devices 518 are also connected to the interface circuit 514 of the illustrated example. The output device(s) 518 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 514 of the illustrated example, thus, typically includes a graphics driver card, a graphics driver chip or a graphics driver processor.

The interface circuit 514 of the illustrated example also includes a communication device such as a transmitter, a receiver, a transceiver, a modem and/or network interface card to facilitate exchange of data with external machines (e.g., computing devices of any kind) via a network 520 (e.g., an Ethernet connection, a digital subscriber line (DSL), a telephone line, coaxial cable, a cellular telephone system, etc.).

The processor platform 500 of the illustrated example also includes one or more mass storage devices 522 for storing software and/or data. Examples of such mass storage devices 522 include floppy disk drives, hard disk drives (HDD), compact disks (CD), Blu-ray disk drives, RAID systems, and digital versatile disk (DVD) drives.

Coded instructions 524 to implement the method of FIG. 4 may be stored in the mass storage device 522, in the volatile memory 508, in the non-volatile memory 510 and/or in a removable tangible computer readable storage medium such as a CD or DVD.

From the foregoing, it will be appreciated that the above disclosed methods and apparatus enable an effective engagement and control of the brake modulation system 300 during operations and/or maneuvers of the example vehicle 102. The brake modulation system 300 may periodically monitor for and/or detect conditions associated with poor braking performance or brake pedal feel during low deceleration operations or maneuvers of the vehicle 102 and, when such a condition is detected, modulate a brake fluid pressure within the vehicle 102 at a predetermined frequency to cyclically increase and decrease and, thus, cyclically increase and decrease the amount of frictional engagement between the braking components within the brake assembly 116 of the vehicle 102 that would have otherwise existed in the absence of the modulation. This type of modulation of brake pressures can correct or compensate for a brake pad misalignment and/or other non-ideal characteristics and relationships between braking components within the brake assembly 116 that may cause erratic, fluctuating, and/or unstable frictional engagement between braking components within the brake assembly 116, thereby reducing or eliminating the poor braking performance and brake pedal feel that would have otherwise occurred. Further, the brake modulation system 300 may engage in a manner that is imperceptible to a driver or occupant of the vehicle 102 by predetermining and/or selecting a characteristic of the modulation. Additionally, the brake modulation system 300 may prevent the modulation of a brake pressure within the vehicle 102 or, more generally, the engagement of the brake control system 300 if the conditions associated with low deceleration operation are not detected.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are related to vehicle brake systems with brake control systems, the examples disclosed herein may be applied to any appropriate brake control use.

What is claimed is:

1. An apparatus comprising:
 a controller configured to:
 determine a deceleration of a vehicle via a deceleration sensor;
 compare the deceleration to a first threshold; and
 increase and decrease, at a predetermined periodic frequency via a brake pressure actuator, a brake pressure of the vehicle in response to the deceleration being below the first threshold, wherein the controller is to increase and decrease the brake pressure by generating a sinusoidal or a sawtooth waveform.

2. The apparatus of claim 1, wherein the controller is further configured to:
 determine a driving condition of the vehicle;
 compare the driving condition to a criterion;
 select the sinusoidal or the sawtooth waveform in response to the driving condition satisfying the criterion; and
 increase and decrease, at the predetermined periodic frequency, the brake pressure by using the selected waveform.

3. The apparatus of claim 1, wherein the controller is further configured to:
 detect a brake apply operation of the vehicle; and
 increase and decrease, at the predetermined periodic frequency, the brake pressure of the vehicle in response to the detection of the brake apply operation and the deceleration being below the first threshold.

4. The apparatus of claim 3, wherein the brake apply operation is performed by a controller.

5. The apparatus of claim 1, wherein the controller is further configured to:
 determine a speed of the vehicle;
 compare the speed to a second threshold; and
 increase and decrease, at the predetermined periodic frequency, the brake pressure of the vehicle in response to the speed being below the second threshold and the deceleration being below the first threshold.

6. An apparatus comprising:
 a controller configured to:
 detect a brake apply operation of a vehicle via a brake apply sensor; and
 increase and decrease, at a predetermined periodic frequency via a brake pressure actuator, a brake pressure of the vehicle in response to the detection of the brake apply operation and the brake pressure being below a first threshold, wherein the controller is to increase and decrease the brake pressure by generating a sinusoidal or a sawtooth waveform.

7. The apparatus of claim 6, wherein the brake apply operation is performed by a controller.

8. The apparatus of claim 6, wherein the controller is further configured to:
- determine a driving condition of the vehicle;
- compare the driving condition to a criterion; and
- select the sinusoidal or the sawtooth waveform in response to the driving condition satisfying the criterion.

9. The apparatus of claim 8, wherein the sinusoidal or the sawtooth waveform comprises the predetermined periodic frequency and an amplitude, and wherein the controller is further configured to select the predetermined frequency or the amplitude in response to the driving condition satisfying the criterion such that the increasing and decreasing brake pressure is imperceptible to a driver of the vehicle.

10. The apparatus of claim 6, wherein the controller is further configured to:
- determine a speed of the vehicle;
- compare the speed to a first threshold; and
- increase and decrease, at the predetermined periodic frequency, the brake pressure of the vehicle in response to the speed being below the first threshold and the detection of the brake apply operation.

11. A tangible machine-readable medium comprising instructions which, when executed, cause a processor to at least:
- determine a deceleration of a vehicle via a deceleration sensor;
- compare the deceleration to a first threshold; and
- increase and decrease, at a predetermined periodic frequency via a brake pressure actuator, a brake pressure of the vehicle in response to the deceleration being below the first threshold, wherein the controller is to increase and decrease the brake pressure by generating a sinusoidal or a sawtooth waveform.

12. The machine-readable medium of claim 11, further including instructions, which when executed, cause the processor to:
- determine a driving condition of the vehicle;
- compare the driving condition to a criterion;
- select the sinusoidal or the sawtooth waveform in response to the driving condition satisfying the criterion; and
- increase and decrease, at the predetermined periodic frequency, the brake pressure by using the selected waveform.

13. The machine-readable medium of claim 11, further including instructions, which when executed, cause the processor to:
- determine a brake apply operation of a vehicle; and
- increase and decrease, at the predetermined periodic frequency, the brake pressure of the vehicle in response to the detection of the brake apply operation and the deceleration being below the first threshold.

14. The machine-readable medium of claim 13, wherein the brake apply operation is performed by a controller.

15. The machine readable medium of claim 11, further including instructions, which when executed, cause the processor to increase and decrease, at the predetermined periodic frequency, the brake pressure of the vehicle in response to the brake pressure being below a second threshold and the deceleration being below the first threshold.

16. The machine readable medium of claim 11, further comprising instructions, which when executed, cause the processor to:
- determine a speed of the vehicle;
- compare the speed to a second threshold; and
- increase and decrease, at the predetermined periodic frequency, the brake pressure of the vehicle in response to the speed being below the second threshold and the deceleration being below the first threshold.

\* \* \* \* \*